Figure 1:
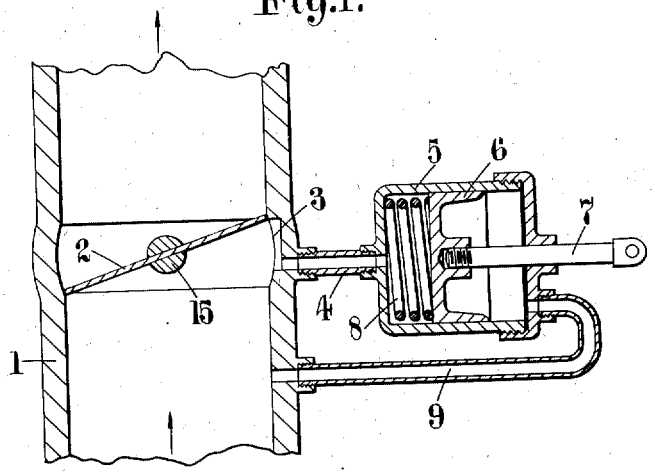

Jan. 8, 1929. W. O. KENNINGTON Re. 17,189

VACUUM OPERATED BRAKE

Original Filed Nov. 5, 1924

INVENTOR
W. O. Kennington
BY
Langner Parry Card & Langner
ATTORNEYS.

Reissued Jan. 8, 1929. Re. 17,189

UNITED STATES PATENT OFFICE.

WILLIAM OSCAR KENNINGTON, OF LONDON, ENGLAND, ASSIGNOR TO GENERAL MOTORS CORPORATION, OF DETROIT, MICHIGAN, A CORPORATION OF DELAWARE.

VACUUM-OPERATED BRAKE.

Original No. 1,541,266, dated June 9, 1925, Serial No. 747,917, filed November 5, 1924. Application for reissue filed February 12, 1927. Serial No. 167,851.

This invention has reference to a motive power device associated with an internal combustion engine. It has been designed especially for operating the brakes of automobiles by vacuum. It is more particularly but not exclusively concerned with vehicles of the type wherein a brake is provided for each wheel.

A primary object is to provide a motive power device associated with an internal combustion engine wherein the suction of the engine operates the device and wherein the operation of the motive power device in no way interferes with the normal action of the engine. An application of the invention is herein described wherein the device is intended to operate the brakes of a motor vehicle. The construction consists of few parts; may be economically constructed; is easily operated; and is highly efficient in use.

With these ends in view and such others as may hereinafter appear or are incidental thereto the invention in its broadest aspect may be said to consist in the provision of means whereby the suction of the engine is utilized to actuate the brake mechanism when the throttle valve of the engine is moved beyond what is normally the closed position.

More specifically regarded the invention is embodied in an arrangement wherein the suction of the engine actuates a piston bellows or other appropriate pressure contrivance when the throttle valve has been moved to a position beyond what may be termed the normally closed position of the valve said piston or like contrivance being then adapted to actuate the mechanism whereby the brakes are applied.

In accordance with my invention I provide that part of the intake pipe of the engine with a recess so located that when the throttle valve is in a position to restrict or interrupt the supply of combustible mixture from the carburettor to the engine or in other words when it is in the normally closed position the upper lip of the recess is opposite the edge of the throttle valve. The aforesaid recess communicates by means of a suitable connection such as a pipe with a suction operated device for example a piston or its equivalent or other like contrivance adapted in operation to actuate the brake mechanism through suitable connections when the aforesaid suction device is subjected to the suction of the engine as will presently be explained.

The throttle valve which may be of the ordinary butterfly piston or other convenient type is mounted in the intake pipe of the engine and when fully opened permits the passage of the maximum quantity of combustible mixture and when it is desired to decelerate the engine the throttle is moved into the requisite position and when it is in what is normally the closed position it restricts the passage of combustible mixture to the engine all as is usual in internal combustion engines of the type to which this invention refers. According to this invention in this position the throttle is at one edge of the aforesaid recess in the intake pipe and if it is now desired to apply the brakes the throttle is moved across the recess towards the other edge and thereby places the piston or its equivalent or other pressure mechanism in communication with the suction side of the throttle valve whereby the said pressure mechanism is gradually subjected to the suction of the engine and the brakes which as above stated are connected to the pressure mechanism are applied. When the throttle is in the position just described the pressure mechanism is subjected to the full suction effect of the engine and during the movement of the throttle from the normally closed position to the extreme position the combustible mixture can leak past the recess around the edge of the throttle valve to the engine whereby the latter is supplied with sufficient mixture to enable it to turn over and at the same time the brakes are gradually applied.

In order that the invention may be clearly understood by those skilled in the art to which it appertains reference will now be made to the accompanying drawings which illustrate one manner of carrying the invention into effect.

Figure 2:
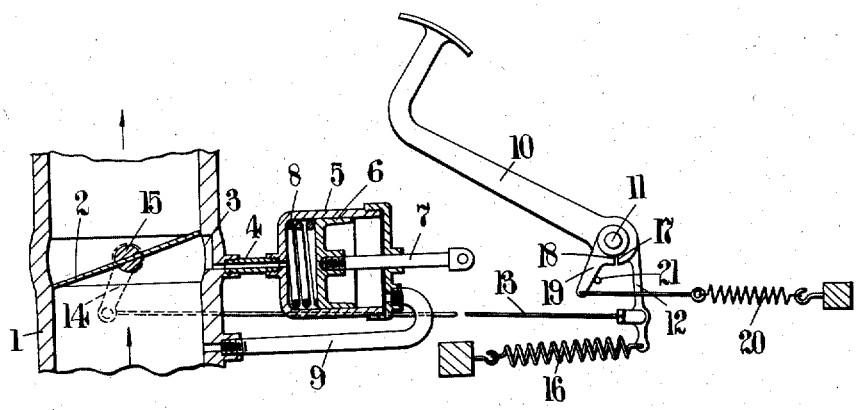

Fig. 1 represents a section through the intake pipe of an internal combustion engine and of one form of pressure mechanism for operating the brakes in accordance with my invention and Fig. 2 is a diagrammatic view in sectional elevation of the general arrangement of parts wherein my invention is embodied.

In the drawings wherein the same reference numerals indicate the same or similar parts 1 represents the intake pipe of an internal combustion engine for use in an automobile or the like and having a throttle valve 2 for controlling the passage of combustible mixture to the engine the intake being provided with a recess 3. Communicating with the recess 3 by means of a pipe 4 is a pressure operated device comprising a cylinder 5 having a piston 6 to which is secured a brake control rod 7 adapted to be secured to the brake mechanism whereby the brakes are applied to the wheels.

In the construction illustrated I have shown a spring 8 for the purpose of assisting in returning the rod 7 when the suction of the engine on the piston 6 is released to the inoperative position thereby bringing the brake mechanism to the "off" position. The rear side of the piston 6 may be open to atmosphere but should serious leakage of air past the piston occur it might conceivably detrimentally affect the composition of the combustible mixture when the parts are in position to apply the brakes. I may therefore provide a pipe connection 9 between the intake pipe 1 on the carburetor side of the throttle valve 2 and the rear of the piston 6 so that any leakage past the latter will be leakage of normally rich mixture.

In operation when it is desired to decelerate the throttle is moved into the normally closed position shown in Fig. 1 in which position it restricts the passage of combustible mixture to the engine. If now it is desired to apply the brakes the throttle is moved across the recess 3 whereby, as pipe 4 communicates with the intake pipe 1 above valve 2 the piston 6 is gradually subjected to the engine suction and the brake applied. During this movement of the throttle the combustible mixture from below the throttle valve can leak around the edge of the throttle to the engine whereby a sufficient quantity of mixture is supplied to the engine to enable it to run or turn over and the brakes are gradually applied. The means whereby this is effected is more clearly shown in Figure 2 the movement of the throttle 2 being controlled by a pedal 10 mounted on a spindle 11 and having an extension 12 connected by means of a rod 13 to the usual arm 14 of the throttle valve spindle 15. When it is desired to decelerate pressure on the pedal 10 is decreased whereupon a relatively strong spring 16 moves the throttle clockwise into the normally closed position. If now it is desired to apply the brakes the pressure on the pedal 10 is still further decreased and the spring 16 moves the throttle beyond the normally closed position. During this movement a clutch member 17 on the extension 12 engages a co-operating clutch member 18 on the arm 19 mounted on spindle 11 and moves said arm 19 against the action of a relatively weak spring 20 which normally retains the arm 19 in contact with a stop 21. Immediately the spring 16 begins to move the pedal 10 upwards against the action of the spring 20 the driver of the vehicle feels a difference in the pressure requisite for operation of the pedal 10 and is advised thereby of the position of the throttle and that the brakes are being applied.

One essential characteristic of my invention should be particularly noted. The chamber within cylinder 5 with which the pipe 4 communicates is always supplied with carburetted mixture. In the "release" position as when the throttle is open, or when it is closed to the position shown by Fig. 1, the chamber within cylinder 5 fills with carburetted mixture. In applying the brake the engine suction reduces the pressure within the chamber but the gas withdrawn is not air, which may lean the mixture just when it should not be leaned, but is precisely the quality of mixture for which the engine has been adjusted. In a device of this type, were pure air admitted to the variable volume chamber, a very considerable change in the proportions of the mixture would occur with each brake application. With my arrangement for supplying the chamber with engine mixture instead of air, my brake operation in no way affects the action of the engine.

Any other convenient indicating means may be employed and if desired a stop may be provided to arrest the pedal lever or the like actuating the throttle valve when this latter has been moved to the normally closed position means such as a lever or the like or a control on the steering wheel being provided to move the stop out of the path of the pedal or lever operating the throttle to permit said lever and consequently the throttle being further actuated and the brakes applied.

It will be understood that I may if desired provide means for coordinating my improved brake mechanism with the ordinary foot or hand brake in such a manner that a preliminary braking may be effected by the means I have described followed by further braking by means of the foot or hand brake. Means may also be provided for actuating the rod 7 by manually or pedal controlled means but as these refinements will be apparent to those skilled in the art to which this invention appertains further description thereof is here deemed unnecessary.

While I have described one construction of parts of my improved brake mechanism and the operation thereof I am aware that changes of construction and operation may be made without departing from the spirit and scope of the invention for example instead of one pressure device as shown and described I may provide more than one as may be deemed advisable according to the kind of vehicle to which my invention is to be applied and I therefore do not wish to be understood as limiting the scope of my claims by the positive terms employed in connection with the description.

I claim:

1. A vaccum operated brake mechanism for automobiles and like vehicles, comprising, the combination of the usual brake and throttle mechanism, and means operated by the suction of the engine to actuate the brake mechanism when the throttle is moved beyond what is normally the closed position.

2. A vacuum operated brake mechanism for automobiles and like vehicles comprising a pressure operated device adapted to be actuated by the suction of the engine when the throttle valve of the engine is moved beyond the normally closed position and mechanism connecting said device to the brakes of the vehicle.

3. A vacuum operated brake mechanism for automobiles and like vehicles comprising a pressure operated device means for connecting said device to the brakes of the vehicle and means for moving the throttle valve of the engine beyond the normally closed position to permit the suction of the engine to actuate the pressure operated device and apply the brakes.

4. A vacuum operated brake mechanism for automobiles and like vehicles comprising a pressure operated device mechanism cooperating therewith to apply the brakes to the wheels of the vehicle when the said device is actuated, means whereby the throttle valve of the engine can be moved beyond the normally closed position to permit the suction of the engine to actuate the pressure operated device and means whereby the engine is kept running when the throttle valve has been moved beyond the normally closed position.

5. A vacuum operated brake mechanism for automobiles and like vehicles comprising a pressure operated device mechanism for connecting said device to the brakes of the vehicle, means whereby the throttle valve of the engine can be moved beyond the normally closed position, means for establishing communication between the suction of the engine and said device when the throttle valve is moved beyond the normally closed position so as to actuate said device and apply the brakes, means whereby combustible mixture can leak past the throttle valve to supply the engine with fuel when the throttle valve has been moved beyond the normally closed position and means for returning the brake mechanism to the "off" position when the throttle valve is opened or partially opened.

6. A vacuum operated brake mechanism for automobiles and like vehicles comprising a pressure operated device mechanism for connecting said device to the brakes of the vehicle, means whereby the throttle valve of the engine can be moved beyond the normally closed position, means whereby when the throttle valve is moved beyond the normally closed position communication is established between the suction of the engine and said device so as to actuate said device and apply the brakes, means whereby combustible mixture can leak past the throttle valve to supply the engine with fuel when the throttle valve has been moved beyond the normally closed position and means for indicating the position of the throttle prior to the brakes being applied.

7. In combination with an internal combustion engine having a conduit for supplying carburetted mixture, a motive power device including a variable volume chamber, means associated with said power device and conduit to supply the former from the latter with carburetted mixture.

8. In combination with an internal combustion engine having a conduit for supplying carburetted mixture, a motive power device including a variable volume chamber, means associated with said chamber and conduit whereby the chamber is supplied with carburetted mixture from the conduit and whereby action of said engine may evacuate said chamber.

9. In combination with an internal combustion engine having a valved inlet conduit for carburetted mixture, a motive power device having a variable volume chamber, means to connect said power device with the pressure in said inlet conduit which exists either above or below said valve whereby the power device is supplied with carburetted mixture or evacuated by the action of said engine.

10. In combination with an internal combustion engine having an inlet conduit for carburetted mixture, a motive power device having a variable volume chamber, said chamber being closed except for means affording communication between said chamber and said inlet conduit, a pipe connecting said chamber with said engine inlet conduit whereby the only fluid which may enter said chamber is the carburetted mixture.

11. The invention defined by claim 10, said engine inlet conduit having a valve and means associated with said pipe and inlet conduit whereby the chamber may at times be supplied with mixture from below said valve and at other times be subjected to the engine suction above the valve.

12. Mechanism for throttle and vacuum brake operation comprising an induction pipe, a throttle therein, a vacuum brake cylinder, a conduit between said cylinder and pipe, a manually operable lever, connections between said lever and throttle whereby manual effort applied to said lever rotates it in one direction to open the throttle, means operable upon said lever to rotate it in the opposite direction to move the throttle beyond its normally closed position and open the conduit for vacuum brake action.

13. The invention defined by claim 12 together with means resiliently resisting such further movement of the lever and thereby give a feeling indication of brake application.

14. In combination with an internal combustion engine having a conduit for supplying carbureting mixture, a motive power device including a variable volume chamber having a movable wall adapted to be connected to a mechanism to be operated thereby, means associated with said chamber and conduit whereby the chamber may at times be supplied with carburetted mixture, and whereby at other times the action of said engine may evacuate said chamber, and manually operable means whereby said operations may be effected.

In testimony whereof I affix my signature.

W. O. KENNINGTON.